Figure 1:
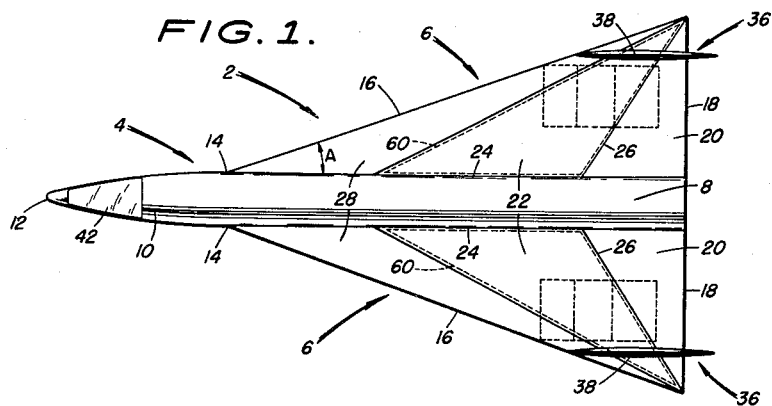

Sept. 1, 1964     J. H. WALKER ETAL     3,146,971

HYPERSONIC AIRCRAFT

Filed March 21, 1963

JAMES H. WALKER
GENE J. PIETRANGELI
INVENTORS

BY Claude Funkhouser

ATTORNEY 3,146,971
HYPERSONIC AIRCRAFT
James H. Walker and Gene J. Pietrangeli, Silver Spring, Md., assignors to the United States of America as represented by the Secretary of the Navy
Filed Mar. 21, 1963, Ser. No. 267,061
10 Claims. (Cl. 244—15)

This invention relates generally to aircraft capable of attaining speeds in excess of sonic velocity, and more particularly to an aircraft embodying two separate air-breathing reaction engine propulsion systems and designed for flight at speeds in the hypersonic range.

Recent advances in aircraft propulsion systems, coupled with the development of relatively light-in-weight structural materials possessing high strengths and the ability to withstand very high temperatures, have made feasible the construction of large aircraft capable of flight in the hypersonic region, that is, at speeds of about Mach 7. The acceleration and deceleration time periods inherent in the operation of such aircraft, and other factors, tend to restrict any operational advantages thereof over slower aircraft, such as those capable of speeds up to about Mach 3, to trips in excess of about 3000 nautical miles. Thus, to be practical a hypersonic aircraft should have a range greater than 3000 miles, and should have a power plant assembly that operates efficiently during the acceleration, mid-course or cruising, and deceleration flight periods.

The necessarily broad range of flight speeds for a hypersonic aircraft (from standstill to Mach 7 and return) makes difficult the selection of a single type of power plant assembly that is sufficiently efficient at all flight speeds. The aircraft of the present invention overcomes this problem by utilizing two air-breathing propulsion systems, the first consisting of a plurality of turbojet engines for the initial acceleration and the deceleration flight periods, and the second comprising a pair of ramjet engines for the final portion of the acceleration period and for maintaining a hypersonic cruising speed.

It is generally recognized that the operating efficiency of a turbojet engine is most favorable up to flight speeds of about Mach 3, and that ramjets operate best at speeds upwardly from about Mach 3 and reach their greatest efficiency level at about Mach 7. Thus, the use of a power plant assembly comprised of both types of engines results in the attainment of an overall level of operating efficiency sufficient to permit long range flights of several thousand miles at hypersonic cruising speeds.

The configuration of the aircraft of the invention has been designed to minimize aerodynamic drag, and the two engine systems have been structurally incorporated thereinto in a manner to substantially eliminate aerodynamic interference therebetween. Thus, the operating efficiency of the aircraft is not compromised by these factors, and an aircraft is provided having minimal drag characteristics throughout its flight program.

Another serious problem encountered with the use of turbojet engines at hypersonic speeds is the very high temperature caused in an engine's duct by the flow of hypersonic air therethrough. In the present invention no air is required or permitted to flow through the turbojets during high speed operation, and hence these temperature problems are alleviated.

It is an object of this invention to provide an aircraft capable of attaining hypersonic flight speeds and having a range capability of several thousand miles.

Another object of the present invention is to provide a hypersonic aircraft so constructed as to employ two separate air-breathing propulsion systems.

A further object of the subject invention is to provide a hypersonic aircraft having two separate, consecutively operated propulsion systems, and which is so constructed that aerodynamic interference of each propulsion system with the overall flight performance of the aircraft during its period of non-operation is at a minimum and each engine is arranged to maintain its internal temperature within desirable limits.

It is also an object of this invention to provide an aircraft having a configuration adapting it to withstand flight conditions at hypersonic speeds.

Another object of the present invention is to provide a hypersonic aircraft employing external expansion ramjet engines for providing lift augmentation as well as propulsive thrust.

Figure 2:
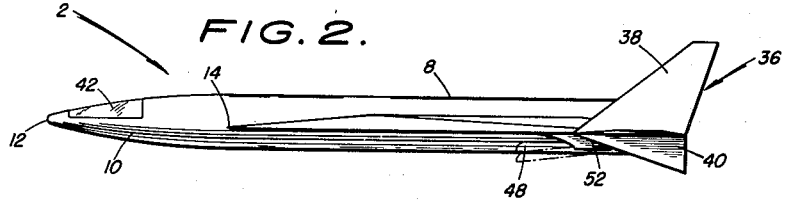
Figure 3:
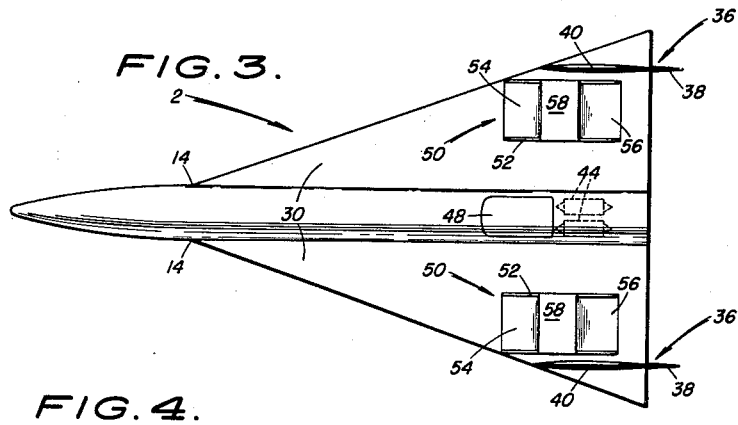
Figure 4:
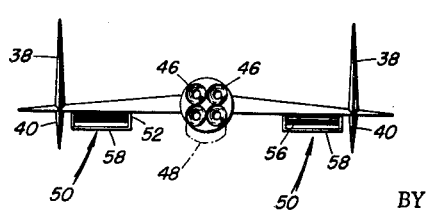

Other objects and many of the attendant advantages of this invention will be readily appreciated as the same becomes better understood by reference to the following detailed description when considered in connection with the accompanying drawings, wherein:

FIG. 1 is a top plan view of the hypersonic aircraft of the invention;
FIG. 2 is a side elevation of the hypersonic aircraft;
FIG. 3 is a bottom view of the hypersonic aircraft; and
FIG. 4 is a view in elevation looking at the aft end of the aircraft.

The aircraft of the invention includes a cylindrical fuselage to which is attached a pair of highly swept back wings that together define generally a delta planiform. A vertical control surface is attached to each wing near its tip, and one of a pair of external expansion ramjet engines is secured under each wing. A plurality of turbojet air-breathing engines are clustered within the aft end of the fuselage, and air is supplied thereto from a retractable scoop diffuser disposed in the under surface of the fuselage just ahead of said cluster.

Referring now to the drawings, a hypersonic aircraft is indicated generally at 2, and includes a fuselage 4 having a pair of wings 6 secured thereto. The fuselage comprises a cylindrical body portion 8 and a downwardly tapering nose portion 10, the latter being circular in cross-section throughout its length and having a gently curving profile; the nose portion terminates in a rounded tip 12, and is faired into the cylindrical body 8.

The wings 6 are attached to the fuselage 4, the most forward portions 14 thereof being positioned at the juncture of the cylindrical body 8 and the nose 10. The planiform of each wing is that of a right triangle, the leading edge 16 thereof comprising the hypotenuse of the triangle and extending rearwardly at an angle A to the cylindrical body 8; typically, the angle A has a value of about 18 degrees.

The top surface of each wing includes a rear, flat panel 20 having substantially the shape of a right triangle and being inclined upwardly from the trailing edge 18, and a middle, flat panel 22 in the shape of an obtuse scalene triangle. The root edge 24 of the middle panel 22 is secured to the cylindrical body portion 8 and extends parallel to the longitudinal axis thereof, and the rear edge 26 of said panel is secured to the front edge of the panel 20. A flat front wing panel 28, also having the shape generally of an obtuse scalene triangle and being inclined downward toward the leading edge 16, has its root edge secured to the body 8 and its rear edge secured to the front edge of the panel 22; the front edge of the panel 28 defines the leading edge 16 of the wing, and is secured to the like front edge of a flat panel 30 which forms the lower surface of the wing. The panel construction for the wings results in a cross-sectional configuration for each wing that is substantially a very acute scalene triangle, as is best shown in FIG. 4.

Attached to each wing 6 inboard a relatively short distance from the tip thereof and extending generally parallel to the central axis of the body 8 is a vertically disposed control surface, or fin, 36, each said fin including an upper portion 38 and a lower portion 40. The upper portion of each fin is swept rearwardly, and in side elevation has the shape of a truncated obtuse scalene triangle. The lower fin portions 40 each have the shape of a right triangle, and if desired may be hinged for folding against the undersurface of their respective wings to provide additional ground clearance during take-off.

The fuselage 4 has a crew compartment 42 in the forward end thereof, and a plurality of conventional turbojet aircraft engines 44, indicated by broken lines in FIG. 3, are mounted in a cluster within the aft portion of said fuselage and are arranged to exhaust through nozzles 46 (FIG. 4). Four turbojet engines are employed in the aircraft shown, but it is to be understood that this number will vary according to aircraft size and weight, and the specific turbojet engines utilized. If it should prove impossible to house a sufficient number of turbojet engines within the fuselage, additional engines may be mounted in the wings adjacent thereto.

The turbojet engines are intended to function primarily during the take-off and landing portions of a flight, and are not in operation during the midcourse cruise period. Accordingly, it is desirable that the turbojet engines and their equipment create as little aerodynamic drag as is possible during the cruise portion of the flight, and that high temperature air not be permitted to flow therethrough during high speed operation of the aircraft.

The turbojet engines 44 require a flow of air for their operation, and in the aircraft of the invention this flow is supplied by a retractable air scoop diffuser 48 positioned in the bottom of the fuselage 4 just forwardly of the engines 44. The air scoop 48 is hinged along its rear edge to the fuselage, and is lowered and raised by a conventional hydraulic system (not shown). During the period when the turbojet engines 44 are in operation the air scoop 48 is in its downward position (indicated by phantom lines in FIGS. 2 and 4), and functions to conduct the necessary quantity of air to said engines. During the midcourse cruise period the air scoop is retracted, said air scoop being constructed to lie flush with the surface of the fuselage in its retracted position; thus, during cruise both the turbojet engines and their air scoop are within the flow lines of the fuselage, and hence cause no airflow disturbance.

Midcourse propulsive force is supplied to the aircraft by a pair of ramjet engines 50, one of said engines being secured to the undersurface of each wing inboard of the surfaces 36. The engines 50 are external burning ramjet engines of the type described in copending U.S. patent application Serial No. 250,992, filed January 10, 1963, entitled "External Expansion Ramjet Engine." Because these engines are the subject of another invention, they will not be described in detail herein. Briefly, however, each engine comprises a main body 52 having thereon a forwardly facing isentropic external compression surface, or ramp, 54 and a rearwardly facing external expansion surface, or ramp 56. A cowling 58 is secured centrally of the main body 52 in spaced relationship thereto, and together with the body defines a flow duct. Incoming supersonic air is compressed by the ramp 54 and flows into the duct defined between the body and the cowl, within which duct fuel is added to the airflow and is ignited. The burning gases then expand over the ramp 56, providing thrust and a degree of lift. The ramps are preferably so constructed that they may be retracted toward the wing when not in use, whereby to reduce drag. Since the ramjets are utilized only at high altitudes in the aircraft of the invention, at which altitudes air pressures are relatively low, no difficulty is encountered in erecting the ramps.

The ramjet engines 50 are started after the aircraft is airborne and after it has attained a supersonic speed of about Mach 3 or 4. They then accelerate the aircraft to cruising speed, and maintain that speed until the terminal portion of the flight.

Fuel is supplied to all the engines from fuel tanks housed within the central portions of the wings 6, said tanks being indicated by broken lines at 60 in FIG. 1.

The general delta configuration thereof results in favorable aerodynamic characteristics for the aircraft, including a relatively high lift to drag ratio at high speeds, minimum center of pressure travel with Mach number changes, and alleviation of aerodynamic heating problems because of the sharply swept wings. Further, the delta configuration is relatively compact, and the structural integrity and aeroelastic characteristics of the aircraft are good. The wing tips can be drooped at high speed to achieve satisfactory dihedral effects.

The physical dimensions of the aircraft will obviously vary, depending upon the performance requirements thereof. Typically, an aircraft capable of carrying a 30,000 pound payload would include a fuselage about 175 feet long and 14 feet in diameter, and the tip to tip wingspan thereof would be about 102 feet.

The temperatures encountered in the uncooled airframe at Mach 7 and at an altitude of 100,000 feet are about 2,300° F. for the nose and leading edges of the wings and about 1,100° F. for the surfaces of the fuselage and the wings. These temperatures require careful selection of materials for the airframe; it has been found that stainless steel sandwich honeycomb construction will provide the necessary strength, and will withstand such temperatures without failure. The leading edges of the aircraft, because they are subjected to very high temperatures, must be constructed of ablative or like materials to withstand such temperatures. Cooling of the crew and cargo compartments by auxiliary equipment is necessary to maintain the temperatures therein within tolerable limits.

In operation, the turbojet engines 44 provide the necessary power for take-off and to accelerate the aircraft to a velocity of about Mach 3.6, at which speed the turbojets 44 are turned off and the ramjet engines 50 are started. In a typical flight trajectory the turbojets furnish power to permit the aircraft to become airborne and to climb to an altitude of about 70,000 feet and attain a speed of about Mach 3.6. The external expansion ramjet engines 52 are then started, and permit the aircraft to attain a cruise altitude of 100,000 feet and a speed of Mach 7. At the end of the cruising portion of the flight the ramjet engines are extinguished, the ramps thereof are retracted, and descent of the aircraft from cruise altitude commences in a powerless glide. At a nominal Mach number of 1.25 and an altitude of about 35,000 feet the turbojets are ignited and provide power for let-down and landing.

Obviously, many modifications and variations of the present invention are possible in the light of the above teachings. It is therefore to be understood that within the scope of the appended claims the invention may be practiced otherwise than as specifically described.

What is claimed is:
1. An aircraft comprising,
   a fuselage,
   a pair of wings attached to said fuselage,
   a pair of fins, one mounted on each wing,
   turbojet engine means mounted within the aft end of said fuselage, and
   ramjet engine means secured to the undersurface of each wing.
2. An aircraft as recited in claim 1, including additionally
   retractable air scoop means mounted in said fuselage for admitting air to said turbojet engine means.
3. An aircraft comprising,
   a generally cylindrical fuselage,
   a pair of triangular in planiform wings secured at their root ends to said fuselage, a pair of vertical fins, one mounted on each wing near the tip thereof,
  turbojet engine means mounted within the aft end of said fuselage,
  retractable air scoop means mounted in said fuselage forwardly of said turbojet engine means for admitting air thereto, and
  a ramjet engine means secured to the undersurface of each wing inboard of said vertical fins.

4. An aircraft as recited in claim 3, wherein the planiform of each said wing is that of a right triangle, and wherein the trailing edge thereof projects normally from said fuselage.

5. An aircraft as recited in claim 4, wherein additionally the chords of said wings measured at their root ends are identical and are substantially less than the length of said fuselage.

6. An aircraft comprising,
  a fuselage, said fuselage including a cylindrical body portion and a downwardly tapering nose portion terminating in a rounded tip,
  a pair of wings attached to the cylindrical body portion of said fuselage, the planiform of each said wing being a right triangle and the chord measured at the root end thereof being substantially identical to the length of said cylindrical body portion, and the trailing edges of said wings projecting normally from said cylindrical body portion,
  a pair of vertical fins, one mounted on each wing near the tip thereof,
  turbojet engine means mounted within the aft end of said fuselage,
  retractable air scoop means mounted in the bottom of said fuselage forwardly of said turbojet engine means for admitting air thereto, and
  ramjet engine means secured to the undersurface of each wing inboard of said vertical fins.

7. An aircraft as recited in claim 6, wherein the cross-sectional configuration of each wing is generally a scalene triangle.

8. An aircraft as recited in claim 7, wherein the leading and trailing edges of said wings are relatively sharp, and wherein said leading edges extend at an angle of about 18 degrees from the longitudinal axis of said fuselage.

9. An aircraft as recited in claim 6, wherein said fins each include
  a portion extending upwardly from said wing and having a planiform corresponding generally to a truncated obtuse scalene triangle, and
  a portion extending downwardly from said wing and having a right triangular planiform.

10. An aircraft as recited in claim 6, wherein each said ramjet engine means includes
  a body,
  an external compression ramp on the forward end of said body, said compression ramp defining a diffuser for compressing incoming air, and
  an external expansion ramp on the aft end of said body.

References Cited in the file of this patent

UNITED STATES PATENTS

| | | |
|---|---|---|
| 2,512,794 | Goddard | June 27, 1950 |
| 2,693,325 | Lippisch | Nov. 2, 1954 |
| 2,944,764 | Lane | July 12, 1960 |
| 2,944,765 | Lane | July 12, 1960 |
| 3,027,118 | Willox | Mar. 27, 1962 |